May 14, 1957 — T. R. SCHULZ — 2,792,085
AUTOMATIC SCREW TYPE SLACK ADJUSTER

Filed Dec. 14, 1950 — 2 Sheets-Sheet 1

Inventor:
Theodore R. Schulz
By George F. Vaia
his Attorney

May 14, 1957     T. R. SCHULZ     2,792,085
AUTOMATIC SCREW TYPE SLACK ADJUSTER

Filed Dec. 14, 1950     2 Sheets-Sheet 2

Inventor:
Theodore R. Schulz
By George F. Vaia
his Attorney

United States Patent Office 2,792,085
Patented May 14, 1957

2,792,085

AUTOMATIC SCREW TYPE SLACK ADJUSTER

Theodore R. Schulz, Williamsville, N. Y., assignor to The Symington-Gould Corporation, Depew, N. Y., a corporation of Maryland Application December 14, 1950, Serial No. 200,778

19 Claims. (Cl. 188—202)

This invention pertains to an automatic slack adjuster for use in a railway vehicle.

An object of the invention is the provision of an improved and automatic slack adjuster arranged to function also as a connecting rod between a brake cylinder live lever and an auxiliary lever which may be of the type of a floating or equalizing lever.

Another object of the invention is the provision of an improved automatic slack adjuster which has its operating or movable parts completely incased so as to be shielded aginst damaging or impairing foreign matter such as water, ice, brine, cinders, and the like.

A still further object of the invention is to provide an improved automatic slack adjuster arranged to positively compensate, in the brake rigging, for wear of the brake shoes.

An added object of the invention is to provide an improved automatic slack adjuster with operating parts thereof arranged and constructed in such a manner as to be free of bending loads during all service movements of the brake rigging or gear.

The above and many other general and detailed objects of the invention will become apparent to those skilled in the art to which this invention appertains from a review of the succeeding description considered together with an exemplified form of the invention as illustrated by the accompanying drawings, wherein.

Figure 7:
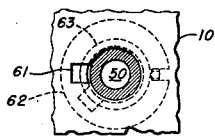
Figure 8:
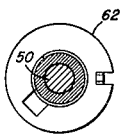
Figure 9:
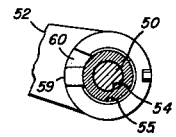
Figure 3:
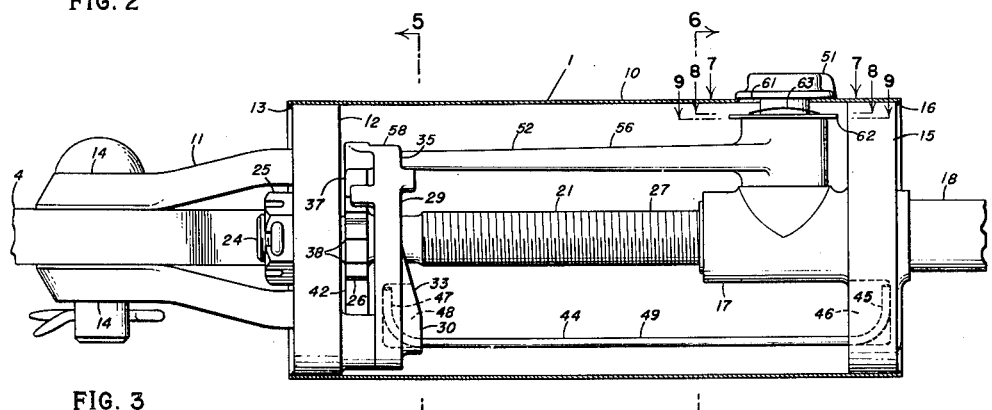
Figure 3 is a side elevational view on the lines 3—3 of Figure 2, looking in the direction of the arrows; the fore part of the adjuster casing being shown removed.
Figure 4:
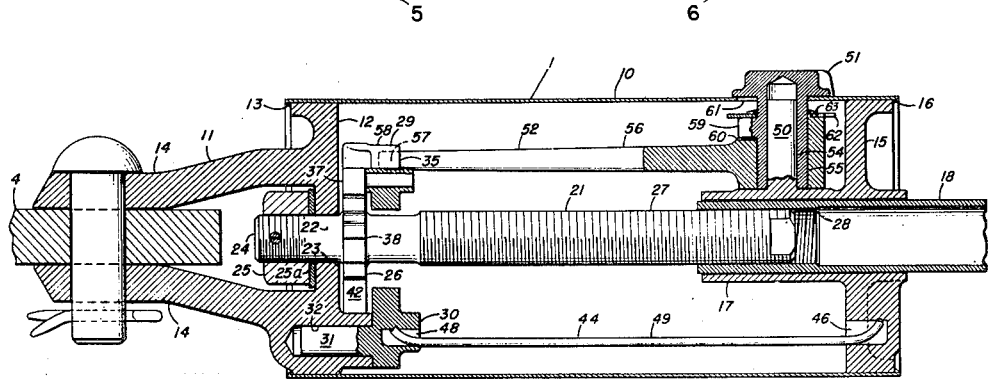
Figure 4 is a central vertical longitudinal sectional view on the lines 4—4 of Figure 2 looking in the direction of the arrows; with parts additionally in fragmental section.

Figures 7, 8 and 9 are horizontal detail sections on the lines 7—7, 8—8, and 9—9, respectively, of Figure 3 and looking in the direction of the arrows.

Referring now in detail to the various figures of the drawings wherein like reference characters indicate like parts the numeral 1 is employed, in a somewhat general manner, to designate an improved automatic slack adjuster for use in a brake rigging, gear or equipment of a railway vehicle. As is commonly known, any brake slack adjuster, be it of an automatic or manually operable type or class, is a device whose function it is to take up the whole or any part of the slack in a brake rigging or gear arranged between an air brake cylinder 2 and the brake shoes (not shown) in order that a given travel of a brake cylinder piston or piston rod 3 shall conform to a maximum of braking effect. Also the brake cylinder is anchored or fastened securely to an underframe (not shown) of a railway vehicle, usually somewhere between the ends and sides thereof.

By way of illustration only, the brake cylinder has adjacent thereto a brake cylinder lever 4 and an auxiliary lever 5; the latter of which may be of the floating or equalizing type. While the brake cylinder lever, hereinafter sometimes referred to as the cylinder lever, has one end 6 thereof pin connected to the cylinder piston through which braking forces originate or are applied to the brake rigging, the auxiliary lever may have an opposed end 7 thereof pin connected or anchored, through a suitable bracket 8, to the railway vehicle underframe or superstructure. Pivotally fastened to the free ends 9 of the cylinder and auxiliary levers are suitable brake rods (not shown) which function as media for transmitting the braking forces through suitable or the remaining (not shown) combination rod and lever rigging, from the cylinder and auxiliary levers to the brake shoes. The cylinder and auxiliary levers are connected, intermediate their ends, by the improved automatic slack adjuster which functions as a true connecting rod in transmitting braking forces from the cylinder lever to the auxiliary lever. It seems appropriate to state, at this juncture, that when the brake cylinder is charged and the piston is accordingly moved outwardly thereof, the free ends 9 of the cylinder and auxiliary levers are moved in directions substantially toward one another to cause the application of the brake shoes at respective trucks (not shown), and thus the slack adjuster is not subjected to any bending loads, this being a distinct advantage because the operating parts of the slack adjuster will then not be subjected to distorting or damaging stresses.

Forming a part of the slack adjuster is a tubular, cylindrical or hollow shell, housing or casing 10 which may be of relatively thin, sheet metal and intentionally open at both ends. Associated with one end of the casing is a cylinder lever clevis 11 being formed in part by an angular or circular base plate 12 which for all purposes forms an integral part of the housing and is arranged to fit snugly or neatly into the shell and be secured in place by any manner or means such as the illustrated weld 13. Outstanding of the shell horizontally from the base plate, is a pair of spaced apertured fingers 14 which embrace or suitably and adequately overlap the cylinder lever and are pivotally connected thereto so as to be moved therewith in response to service or reciprocatory actions of the piston. Associated with the other open end of the shell is a circular disk or closing plate 15 also forming a part of the housing and arranged to fit neatly within the casing to be secured thereto so as to form an integral part thereof by any manner or means such as the illustrated weld 16 which, like the weld 13, preferably is continuous about the outer periphery of the closing plate to insure a seal at this juncture. Arranged axially relative to the shell and disk is a supporting or guiding sleeve 17 of hollow or truly cylindrical formation and projecting through the closing plate inwardly and outwardly of the casing as an integrally formed part of the closing plate. This sleeve is arranged to guide and offer full support for a section of tubing or an adjusting nipple 18 with the latter being preferably of such an outside diameter so as to fit neatly within the sleeve and also move relatively freely, in an axial direction, therein. Forming an outward continuation of the tubing is an extension rod 19 having one end thereof projecting into and firmly secured to a contiguous end of the nipple so as to present an integral part thereof and formed, at an opposed spaced end, with a jaw or clevis 20; the latter of which is pivotally connected to the auxiliary lever intermediate the ends thereof as previously stated. As will be more fully brought out hereinafter, the nipple and extension rod remain radially stationary, being, however, arranged to move axially in unison, in response to service movements of the slack adjuster.

Positioned on the axis of the shell is an adjusting screw or power means 21 having a journal 22 intermediate the ends thereof and arranged to fit neatly into a collar formed by a suitable accommodating aperture 23 in the base plate. Projecting beyond the limits of the base plate to a location between the clevis fingers, is an exteriorly threaded stub 24 forming an integral part of the adjusting screw and to which there is threadedly associated a lock nut 25, which may be the castle type so as to be locked to the stub. Further, in order to prevent or arrest an unwarranted rotary motion of the adjusting screw in a clockwise direction as viewed in Figure 5, and for the purpose to be hereinafter made apparent, a friction member or washer 25a is interposed between the lock nut 25 and the circular base plate. A ratchet or gear 26 is also formed as an integral part of the adjusting screw and this ratchet is positioned adjacent the base plate so that, as the adjusting screw is rotated in service as hereinafter more fully brought out, the ratchet and lock nut will cooperate with the base plate on each side thereof to prevent an axial movement of the adjusting screw relative to the shell. The remaining portion of the adjusting screw, projecting well into the shell axially thereof, is exteriorly threaded as at 27 and such threaded portion extends, in normal position, partially into the sleeve. Some thread interlock between the adjusting screw and adjusting nipple is contemplated. Rather than thread the nipple along its entire inner surface there may be a relatively short section of tubing introduced into one end of the nipple; however, it is preferred to provide a thickened area 28 integral with the nipple and interiorly thread such area to accommodate the exterior threads of the adjusting screw.

Accordingly, by considering the structure described to the above extent, it will be noted that any rotative movement of the adjusting screw will result in a predetermined elongation or contraction of the effective length of the slack adjuster and such change in the length of the slack adjuster will be reflected in the relative positions of the cylinder lever and auxiliary lever. It appears pertinent to state generally at this juncture that as the brake shoes become worn, in order to maintain a maximum braking power, because of the limited predetermined movement of the brake cylinder piston, the relationship of the cylinder and auxiliary levers must be altered and such alteration should be progressively responsive to the progress of shoe wear. Also, the adjustability of the structure should, as hereinafter reflected, be automatic so that the slack shall be taken up as it develops as the result of shoe wear and thereby place no reliance on the human element of periodically checking the brake rigging for excessive slack.

Figure 5:
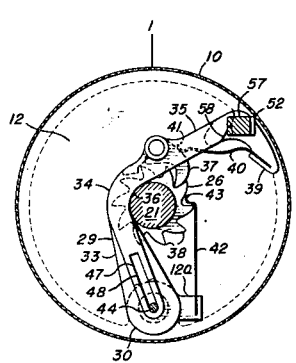
Figure 5 is a transverse vertical sectional view on the lines 5—5 of Figure 3 looking in the direction of the arrows.
Figure 6:
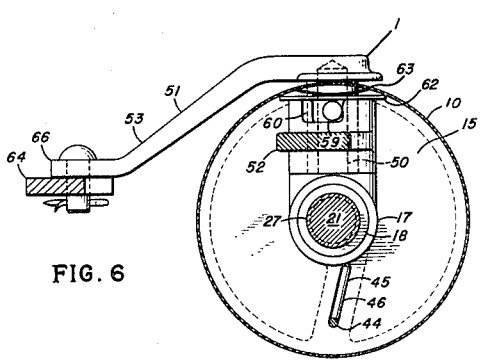
Figure 6 is a transverse vertical sectional view on the lines 6—6 of Figure 3 looking in the direction of the arrows.

Toward the accomplishment of this latter feature of rendering the operation of the involved structure automatic there is provided, in close proximity to the ratchet within the confines of the shell, a ratchet operating lever 29 preferably of somewhat curved or gooseneck design in elevation when viewed as illustrated particularly in Figure 5 of the drawings. This ratchet operating lever is formed, in part, by a lower hub 30 having outstanding horizontally therefrom an integrally formed pintle or pin 31 which extends into a suitable aperture 32 in the circular base plate. The pintle, spaced a predetermined distance from the adjusting screw and preferably arranged parallel therewith, functions as a pivotal anchor about which the ratchet operating lever may be rotated in service.

Also, outstanding from the hub in a direction substantially normal to the pintle is a shank 33 extending normally toward the adjusting screw and at which location it is curved slightly as at 34 to follow the contour of the adjusting screw for a slight distance and then continue tangentially to the adjusting screw as a free extremity or terminal arm 35. This particular configuration just described not only allows the ratchet lever to be disposed within the confining shell and allow it to travel through its entire range of service movement but, in addition, the contract 36 between the ratchet lever curved intermediate portion and the operating screw presents a definite stop to limit the travel or movement of the ratchet lever in a clockwise direction as viewed in Figure 5. A pawl or dog 37 is pivotally mounted on the terminal arm adjacent to but, however, spaced a predetermined distance from the curved intermediate portion of the ratchet lever. This dog, pivotally mounted on a side of the ratchet lever, is in alignment with or in an extended plane of the ratchet and, so located, is arranged to engage teeth 38 of the ratchet, as will be obvious from an inspection of the drawings and particularly Figure 5 thereof. It is important that the dog be urged toward the ratchet so as to be constantly arranged to move or trip over the teeth of the ratchet when the ratchet lever is moved in an arc away from the operating screw and more particularly arranged to fall in behind a particular tooth to rotate the adjusting screw as the ratchet lever reaches the end of its travel and returns to its normal position. Toward this end the extreme outer tip of the terminal arm is provided with a ledge or rest 39 arranged normally to the remaining portion of the terminal arm. To this ledge or rest there is firmly secured by any manner or means a leaf spring 40 which extends from the ledge toward the dog and terminates in a curved lip 41 bearing directly against the dog to urge the latter, constantly, toward and into contact with the ratchet.

When the ratchet lever is moved in a counter-clockwise direction as viewed in Figure 5 and thus positions the pawl so as to be capable of rotating the adjusting screw, the adjusting screw must be restrained from rotating in a like direction and toward this end the base plate is provided with a pad 12a which is positioned inwardly of the shell in alignment with the ratchet. To this pad there is attached in a firm manner, a ratchet holding arm 42 having an extremity 43, remote from the pad, of angular conformation and poised constantly to be engaged by a related ratchet tooth to present a barrier precluding any rotative motion of the ratchet or the adjusting screw in a counter-clockwise direction. The ratchet holding arm extremity 43 is in the nature of a shoe, for while it prevents an unwanted rotary motion of the ratchet it also is free to ride over a tooth as the ratchet is rotated in a desired direction. For this reason, therefore, the ratchet holding arm should, preferably, be formed of spring steel to incorporate therein some degree of flexibility and render it inherently capable of returning to its normal tooth engaging or arresting position.

When slack occurs in the brake rigging and such slack has attained the magnitude of requiring a take-up or adjustment it will be hereinafter shown that the ratchet arm will be moved in a counterclockwise direction allowing the pawl to trip over one or more teeth of the ratchet, depending upon the slack condition prevailing during that operation. Some force must be applied to the displaced ratchet lever so that by its returning to normal position, the ratchet shall be rotated a given degree and the effective length of the slack adjuster shortened to accomplish its take-up or adjusting feature. Many arrangements and constructions present themselves as adequate and suitable for returning the ratchet operating lever to normal position; however, it is preferred to introduce into this arrangement a torsion spring 44 with round bar spring steel stock being employed or selected for the material. This torsion spring is of U or channel shape to thereby present one terminal leg 45 locked in a suitable accommodating groove 46 in the disk closing plate and another terminal leg 47 confined in a suitable slot 48 present in the ratchet lever shank. It is of interest here to note that an intermediate portion 49 of the torsion spring all of which is contained within the shell, has an axis in horizontal alignment with the axis of the ratchet operating pintle and thus no abnormal stresses, except the intended torsion stresses, will be built up in the torsion spring. As the torsion spring is assembled under torsion it will function as a positive means for returning the ratchet operating lever to normal position.

Figure 2:
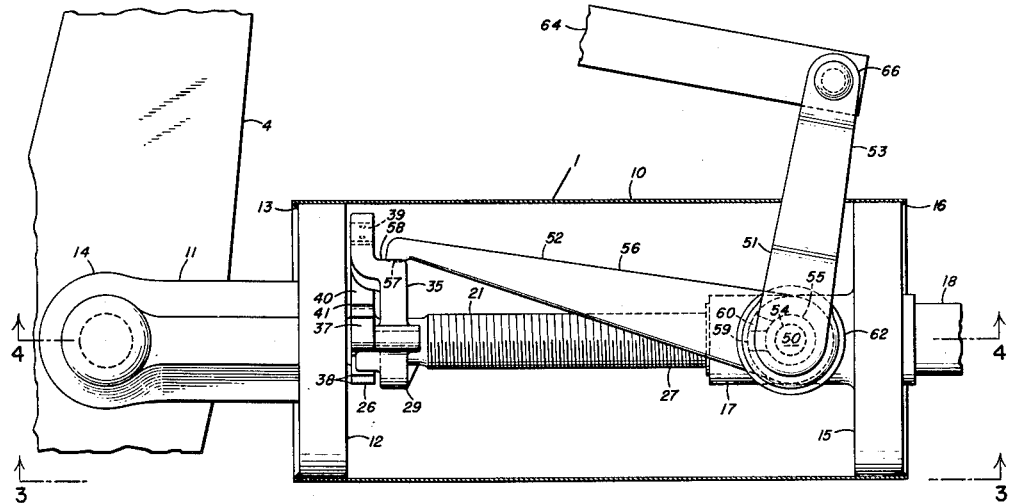
Figure 2 is an enlarged view of a portion of the showing of Figure 1, with the fore part of the adjuster casing removed.

As previously set forth, it will be recalled that the adjusting screw is rotated a required degree in response to a requirement of slack take-up and that the motivating factor is the displacement of the ratchet operating lever. This displacement must, of course, be accurate and truly responsive otherwise insufficient slack may be taken up or more slack than is required will be taken up; one of which is as undesirable as the other. For an accurate and positive ratchet operating lever actuating mechanism there is provided in the arrangement forming this invention, a standard or post 50 outstanding from the sleeve substantially normal thereto and within the confines of the shell. The post projects toward the shell but, however, preferably terminates short thereof. Associated with and arranged to pivot about the post is a compound lever 51 somewhat in the nature of a bell crank and as such comprising an inner crank arm or lever 52 and an outer crank arm or lever 53; the outer crank arm has, at a shell adjacent the extremity thereof, a cylindrical bearing 54 which is apertured and neatly accommodates the sleeve post. This bearing-post relationship maintains both of the crank arms in a definite position. The inner crank arm is also formed at one end thereof with a tubular bearing 55; however, this bearing is of such dimensions to neatly accommodate the outer crank arm bearing and thus both crank arms are arranged to pivot about a common axis or the sleeve post. Outstanding horizontally from the tubular bearing of the inner crank arm is a staff 56 arranged substantially parallel to the adjusting screw as viewed in Figure 3 and terminating near the ratchet operating lever in a foot or shoe 57. This foot is in direct contact with a shoulder or abutment 58 formed on the terminal arm as an integral part thereof preferably between the dog and ledge or rest. The inner crank arm is arranged to pivot in a counter-clockwise direction, when viewing Figure 2, to actuate the ratchet operating lever and displace the latter from normal position so that the pawl may, if the movement has been sufficient, engage a next succeeding tooth or teeth to effect a compensating rotary motion of the adjusting screw. It may be well to set forth here that, by way of example, for every increment of brake shoe wear equal to four one-thousandths of an inch, the inner crank arm will be moved through an arc sufficient to allow the dog to trip over one tooth and to cause the adjusting screw to be rotated a predetermined degree and shorten the effective length of the slack adjuster thus taking up the slack caused by such shoe wear.

The inner and outer crank arms are locked together with a lost motion feature to be hereinafter explained, by the cylindrical bearing of the outer crank arm having projecting therefrom a stud, shear lug or key 59 fitting, rather loosely, in a way or recess 60 in the tubular bearing of the inner crank arm. In this manner some rotary motion of the outer crank arm will be reflected in a corresponding rotary motion of the inner crank arm. It is to be noted that the shell or housing, at a location in alignment with the post, is provided with a key hole opening 61 to permit the application of the cylindrical bearing and after such application a lock plate 62 of substantially the same contour as the keyhole opening being positioned within the confines of the housing, is rotated to lock the cylindrical bearing and necessarily the outer crank arm to the housing. Also, a spring washer 63 is interposed between the housing and lock plate to prevent a rattling action at this juncture as well as to prevent the lock plate from rotating to a position in alignment with the keyhole opening.

Figure 1:
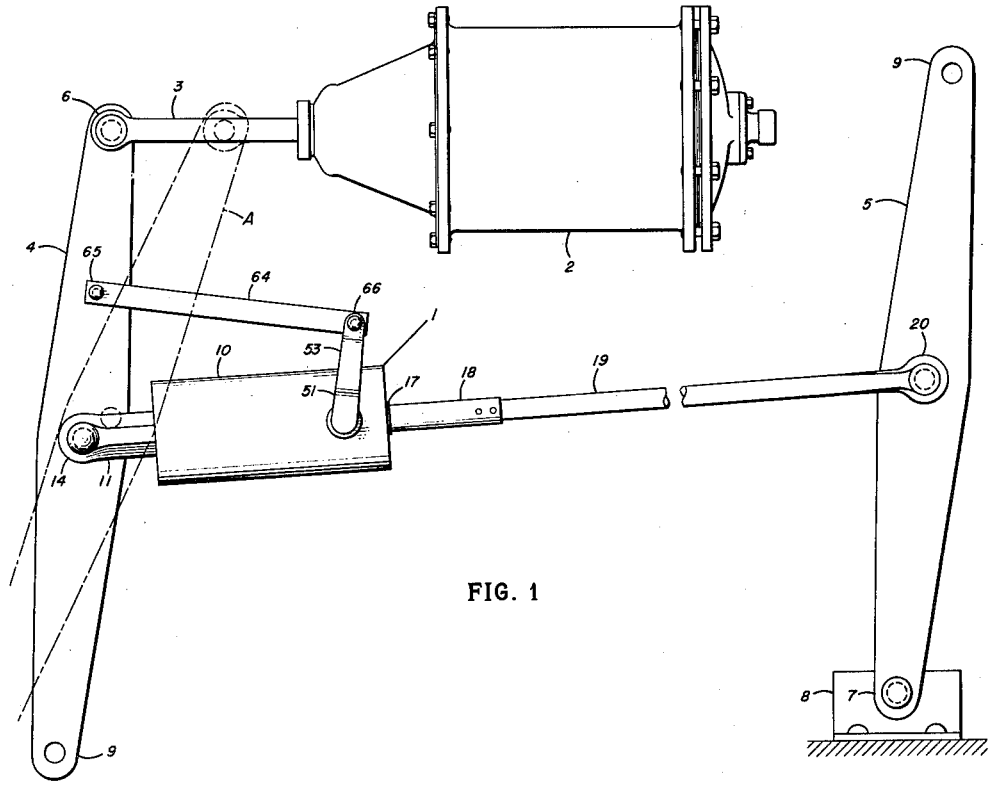
Figure 1 is a plan view of an improved automatic slack adjuster characteristic of the present invention.

The outer bell crank lever, from a position of the cylindrical bearing thereof, extends outwardly of or away from the housing toward the brake cylinder as clearly illustrated in Figure 1 so as to be disposed substantially parallel to the cylinder lever. A connecting link 64 is introduced into the arrangement and functions as a tie between the cylinder lever and the outer crank arm or lever. This connecting link is pivotally fastened to the cylinder lever at a location 65 between the connections of the clevis fingers and piston. Also, this connecting link is pivotally mounted on an extremity 66 of the outer crank arm removed from the cylindrical bearing thereof. By this arrangement it will be noted that an outward movement of the piston will cause the outer crank arm to be rotated in a counter-clockwise direction when viewing Figure 1. This permanent positive connection which the connecting link affords between the cylinder lever and outer crank arm assures an unalterable adjusting movement not influenced by foreign substance such as dirt, ice, etc. The cylinder lever is shown in full lines in Figure 1 at a position or disposition of this lever when the brake shoes are new or unworn and the brakes are applied, as indicated by the extended piston also shown in full lines in Figure 1. The cylinder lever shown in phantom or dot and dash lines "A" in Figure 1 illustrates the position assumed by the cylinder lever with the brake shoes released and also considering the brake shoes as new. It will, therefore, be obvious that as the brake shoes wear, the linkage or mechanism operating the adjusting screw will shorten the effective length of the slack adjuster in an automatic manner, and thus compensating for such wear, the necessary cylinder movement is maintained up to the point of shoe replacement. It was previously stated that an explanation would follow concerning the lost motion connection between the crank arms. It is also to be recalled that the effective length of the slack adjuster is to be shortened only to compensate for wear of the brake shoes. Now, when the piston is actuated in a brake application and released, a movement of the cylinder lever between the positions indicated at "A" in phantom, and in full lines, must not, without a predetermined wear taking place in the brake shoes, result in a rotary motion being imparted to the adjusting screw. Accordingly, the shear lug 59 or key may move in the way or recess 60 without being reflected in a movement of the inner crank arm during an ordinary service movement of the cylinder lever from position "A" to a position indicated in full lines beyond which the connecting link will pull the outer crank arm through a greater degree and this movement will result in the key picking up the inner crank arm to activate the ratchet lever which, in turn, will result in a rotary motion being imparted to the adjusting screw for the purpose hereinabove set forth. In other words the throw of the inner crank arm may be considered selective and responsive only to a predetermined wear of the brake shoes.

It is preferred to charge the housing or shell with a lubricating medium and thus subject the entire operating mechanism within the housing to a lubricating bath which, because of the sealed condition of the housing, will be present for the service life of the slack adjuster.

It may be well to state that, as the brake shoes become worn to such a degree that they have lost their usefulness and it becomes necessary to replace them by the application of new brake shoes, the adjusting screw at this worn stage of the brake shoes will have been turned well into the adjusting nipple and the effective length of the slack adjuster will have been considerably shortened. The extension rod may at this stage be disconnected from the auxiliary lever and then the extension rod can be rotated to increase the effective length of the slack adjuster to such an extent that it will operate effectively with new brake shoes applied.

From the above it will be noted that various changes and alterations may be made to the illustrated and de-

I claim:

1. In an automatic slack adjuster, the combination with a pair of brake levers of, an enclosed housing, means extending axially of said housing and pivotally connected to one of said levers, an adjusting screw rotatably mounted in said housing, non-rotatable means extending axially of said housing and connecting said adjusting screw and said other lever, actuating means pivotally mounted to said housing for rotating said adjusting screw relative to said housing and non-rotatable means, and linkage means connecting said actuating means and said one lever for selectively moving said actuating means.

2. In an automatic slack adjuster, the combination with a pair of brake levers of, a sealed housing, means extending outwardly of said housing and pivotally connected to one of said lever, rotatable means anchored in said housing and positioned axially thereof, non-rotatable means extending axially and outwardly of said housing to connect said rotatable means and said other lever, actuating means pivotally mounted on said housing and arranged to actuate said rotatable means for shortening an effective length of said slack adjuster, a crank arm pivotally mounted in said housing and arranged normal to said actuating means for movement thereof, a second crank arm arranged to actuate said first named crank arm, and means joining said second crank arm and said one lever.

3. In an automatic slack adjuster, the combination with a pair of brake levers of, a lubricant containing housing, means pivotally connecting said housing and one of said levers, power means rotatably anchored in said housing axially thereof, non-rotatable means extending axially of said housing and joining said power means and said other lever, spring pressed actuating means pivotally mounted on said housing and arranged normal to said power means for moving said power means and shortening an effective length of said slack adjuster, compound arms pivotally associated with said housing for moving said actuating means, and means connecting said compound arms and said one lever.

4. In an automatic slack adjuster, the combination with a pair of brake levers of, a lubricant containing housing connected to one of said levers, power means connected to said other lever and rotatably anchored in said housing axially thereof for shortening an effective length of said slack adjuster, spring pressed actuating means mounted on said housing for moving said power means in one direction only, a bell crank pivotally associated with said housing for selectively moving said actuating means, and means pivotally connecting said bell crank and one of said levers.

5. In an automatic slack adjuster, the combination with a pair of brake levers of, a housing connected to one of said levers, threaded means connected to said other lever and rotatably anchored in said housing for shortening an effective length of said slack adjuster, spring pressed means pivotally mounted on said housing and arranged to move normal to said threaded means for actuating said threaded means, a compound crank pivotally associated with said housing and arranged to move normal to said spring pressed means for selectively actuating said spring pressed means, and means spaced from said housing and connecting said compound crank and one of said levers.

6. In an automatic slack adjuster, the combination with a pair of brake levers of, a housing connected to one of said levers, threaded means connected to said other lever and rotatably anchored in said housing for shortening an effective length of said slack adjuster, a ratchet on said rotatable means, spring urged ratchet engaging means pivotally anchored to said housing, an inner crank arm normal to said ratchet engaging means, said inner crank arm being pivotally mounted in said housing and arranged to selectively actuate said ratchet engaging means, an outer crank arm pivotally associated with said housing and arranged to move said inner crank arm, and rigid means pivotally connecting one of said levers and said outer crank arm.

7. In an automatic slack adjuster, the combination with a pair of brake levers of, a housing connected to one of said levers, power means rotatably anchored in said housing for shortening an effective length of said slack adjuster, a ratchet fixed to said power means within said housing, spring pressed means pivotally anchored to said housing and arranged to move normal to said power means for actuating said ratchet, an inner crank arm for imparting motion to said spring pressed means, an outer crank arm for actuating said inner crank arm, lost motion means between said crank arms, and means connecting said outer crank arm and one of said levers.

8. In an automatic slack adjuster, the combination with a pair of brake levers of, a housing connected to one of said levers, power means connected to said other lever and rotatably anchored to said housing for shortening an effective length of said slack adjuster, a ratchet on said power means within said housing, spring pressed means pivotally mounted to said housing for operating said ratchet, an inner crank arm within said housing arranged normal to said ratchet operating means for moving the latter normally to said power means, an outer crank arm connected to said inner crank arm, lost motion means between said crank arms, and means spaced from said housing joining said outer crank arm and one of said levers.

9. In an automatic slack adjuster, the combination with a pair of brake levers of, a housing connected to one of said levers, screw means rotatably anchored to said housing, means guidingly received by said housing and joining said screw means and said other lever, ratchet means on said screw means, ratchet operating means pivotally anchored to said housing for operating said ratchet means, spring means for urging said ratchet operating means toward said ratchet, compound arms pivotally mounted in said housing for moving said ratchet operating means against an action of said spring means, and means outwardly of said housing connecting said compound arms and one of said levers.

10. In an automatic slack adjuster, the combination with a pair of brake levers of, a housing connected to one of said levers, screw means rotatably anchored to said housing, means guidingly received by said housing and joining said screw means and said other lever, ratchet means on said screw means, means pivotally anchored to said housing for operating said ratchet means, spring means for urging said ratchet operating means toward said ratchet, an outer crank arm pivotally mounted in said housing, an inner crank arm pivotally mounted on said outer crank arm and arranged to actuate said ratchet operating means, lost motion means between said crank arms, and rigid means joining said outer crank arm and one of said levers.

11. In an automatic slack adjuster, the combination with a pair of brake levers of, a housing, means connecting said housing to one of said levers, rotatable power means anchored in said housing and connected by non-rotatable means to said other lever, means pivotally mounted in said housing for rotating said power means, and crank means pivotally mounted in said housing and slidably engaging said rotating means for actuating said rotating means, said crank means being connected to said one lever.

12. In an automatic slack adjuster, the combination with a pair of brake levers, of a housing connected to and movable with one of said levers, an adjusting screw within said housing, means connecting said adjusting screw and said other lever, means mounted on said housing, a bell crank comprising an inner arm arranged to effect a rotary motion of said adjusting screw through said mounted means and an outer arm for imparting motion to said inner arm, and means connecting said outer arm and said one lever.

13. In an automatic slack adjuster, the combination with a pair of brake levers, of a housing connected to and movable with one of said levers, rotatable power means in said housing and connected by non-rotatable means to said other lever, means pivotally mounted in said housing for rotating said power means, and lever means pivotally mounted in said housing and slidably engaging said rotating means, said lever means being connected to and actuated by said one lever for actuating said rotating means.

14. In an automatic slack adjuster, the combination with a pair of brake levers, of a housing directly connected to and movable with one of said levers, rotatable power means in said housing and connected by non-rotatable means to said other lever, means pivotally mounted in said housing for rotating said power means, and lever means pivotally mounted in said housing and slidably engaging said rotating means, said lever means being connected to and actuated by said one lever for actuating said rotating means.

15. In an automatic slack adjuster, the combination with a pair of brake levers, of a housing connected to and movable with one of said levers, non-rotatable internally threaded means connected to said other lever, externally threaded means carried by said housing, said second-named threaded means mating with said first-named threaded means and being rotatable relative thereto and to said housing, pawl and ratchet means in said housing for rotating said second-named threaded means, means carrying said pawl and mounted for movement about an axis fixed relative to said housing, and lever means pivotally mounted in said housing and operatively connected to said pawl carrying means for causing relative rotation of said threaded means, said lever means being connected to and actuated by said one lever.

16. In an automatic slack adjuster, the combination with a pair of brake levers, of a housing connected to and movable with one of said levers, rotatable power means in said housing and connected by non-rotatable means to said other lever, ratchet means fixed to said power means, pawl means mounted for movement about an axis fixed relative to said housing and engageable with said ratchet means, spring means anchored to said housing and connected to said pawl means, and lever means pivotally mounted in said housing for loading said spring means and causing said pawl means to rotate said ratchet means and therethrough said power means, said lever means being connected to and actuated by said one lever.

17. In an automatic slack adjuster, the combination with a pair of brake levers, of a housing connected to and movable with one of said levers, rotatable power means in said housing and connected by non-rotatable means to said other lever, ratchet means in said housing and fixed to said power means, pawl means in and mounted for movement about an axis fixed relative to said housing and engageable with said ratchet means, spring means anchored to said housing and connected to said pawl means, and lever means pivotally mounted in said housing for loading said spring means and causing said pawl means to rotate said ratchet means and therethrough said power means, said lever means being connected to and actuated by said one lever.

18. In an automatic slack adjuster, the combination with a pair of brake levers, of a housing connected to and movable with one of said levers, rotatable power means in said housing and connected by non-rotatable means to said other lever, means pivotally mounted to said housing for rotating said power means, spring means anchored to said housing and connected to said rotating means, and lever means pivotally mounted in said housing for loading said spring means and causing said rotating means to rotate said power means, said lever means being connected to and actuated by said one lever.

19. In an automatic slack adjuster, the combination with a pair of brake levers, of a housing directliy connected to and movable with one of said levers, rotatable power means in said housing and connected by non-rotatable means to said other lever, means pivotally mounted to said housing for rotating said power means, spring means anchored to said housing and connected to said rotating means, and lever means pivotally mounted in said housing for loading said spring means and causing said rotating means to rotate said power means, said lever means being connected to and actuated by said one lever.

References Cited in the file of this patent

UNITED STATES PATENTS

| | | |
|---|---|---|
| 330,251 | McLeod | Nov. 10, 1885 |
| 754,246 | Scott | Mar. 8, 1904 |
| 823,095 | Anderson | June 12, 1906 |
| 1,250,656 | Ramey | Dec. 18, 1917 |
| 1,439,730 | Djurson | Dec. 26, 1922 |
| 1,469,572 | Adreon et al. | Oct. 2, 1923 |
| 1,835,008 | Browall | Dec. 8, 1931 |
| 2,169,137 | Bryant | Aug. 8, 1939 |
| 2,283,966 | Brown | May 26, 1942 |